United States Patent
Emerson et al.

(10) Patent No.: US 10,372,400 B2
(45) Date of Patent: Aug. 6, 2019

(54) VIDEO MANAGEMENT FOR COMPUTE NODES

(71) Applicant: HEWLETT PACKARD ENTERPRISE DEVELOPMENT LP, Houston, TX (US)

(72) Inventors: Theodore F. Emerson, Houston, TX (US); David F. Heinrich, Houston, TX (US); Kenneth T. Chin, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/565,225

(22) PCT Filed: May 21, 2015

(86) PCT No.: PCT/US2015/031933
§ 371 (c)(1),
(2) Date: Oct. 9, 2017

(87) PCT Pub. No.: WO2016/186673
PCT Pub. Date: Nov. 24, 2016

(65) Prior Publication Data
US 2018/0074777 A1 Mar. 15, 2018

(51) Int. Cl.
| | |
|---|---|
| G09G 5/36 | (2006.01) |
| G06F 3/14 | (2006.01) |
| H04N 5/76 | (2006.01) |
| G06T 1/60 | (2006.01) |
| H04N 21/2365 | (2011.01) |
| H04N 21/242 | (2011.01) |
| H04N 21/426 | (2011.01) |

(52) U.S. Cl.
CPC .............. *G06F 3/1438* (2013.01); *G06T 1/60* (2013.01); *H04N 5/76* (2013.01); *H04N 21/2365* (2013.01); *H04N 21/242* (2013.01); *G09G 2352/00* (2013.01); *G09G 2360/12* (2013.01); *G09G 2370/24* (2013.01); *H04N 21/42653* (2013.01)

(58) Field of Classification Search
CPC .. G06T 1/60; G09G 5/363; G06F 3/14; G06F 13/00; G06F 13/1605; G06F 3/1438
See application file for complete search history.

(56) References Cited

U.S. PATENT DOCUMENTS

| | | |
|---|---|---|
| 7,966,402 B2 | 6/2011 | Emerson et al. |
| 8,922,585 B2 | 12/2014 | Autor et al. |
| 2008/0005437 A1 | 1/2008 | Gupta et al. |
| 2012/0098841 A1 | 4/2012 | Emerson |
| 2012/0327094 A1 | 12/2012 | Loh et al. |
| 2013/0016111 A1 | 1/2013 | Ghosh |
| 2014/0176587 A1 | 6/2014 | Owen et al. |
| 2014/0189197 A1 | 7/2014 | Krithivas et al. |

OTHER PUBLICATIONS

Oracle's Netra Server X3-2 Server Architecture, (White Paper), Oracle, Mar. 2014, 35 Pages.

*Primary Examiner* — Hau H Nguyen
(74) *Attorney, Agent, or Firm* — Hewlett Packard Enterprise Patent Department

(57) ABSTRACT

An apparatus includes a plurality of compute nodes and a baseboard management controller that is shared by the plurality of compute nodes to manage video for the compute nodes. The baseboard management controller includes video controllers that are associated with the plurality of compute nodes and at least one resource that is shared by the video controllers.

11 Claims, 5 Drawing Sheets

VIDEO MANAGEMENT FOR COMPUTE NODES

BACKGROUND

A typical distributed computer system includes multiple hosts, or compute nodes. For a given computer system, the compute nodes may be formed from physically separate machines, from host partitions within a single physical machine or a combination thereof. An example of a multiple host (or node) distributed computer system is a distributed blade computer system. In this regard, in the blade server architecture, compute nodes are formed from "blades," which are connected to a common power supply. Blades may be mounted in a rack, which includes a power supply and an interconnect structure that is configured to provide remote access to the blades.

DETAILED DESCRIPTION

Embedded management subsystems are ever-increasingly being used in enterprise computing systems. In addition to providing management functions, such as instrumentation and virtual presence, the management subsystem may provide legacy input/output (I/O) for the managed server. Examples of legacy I/O includes serial ports, keyboard/mouse interfaces, flash read only memory (ROM) access, and video. In accordance with example systems and techniques that are disclosed herein, a single management subsystem provides management and legacy I/O services for a plurality of independent compute nodes. Moreover, in accordance with systems and techniques that are disclosed herein, a single management subsystem provides video subsystem I/O for multiple compute nodes.

Figure 1:
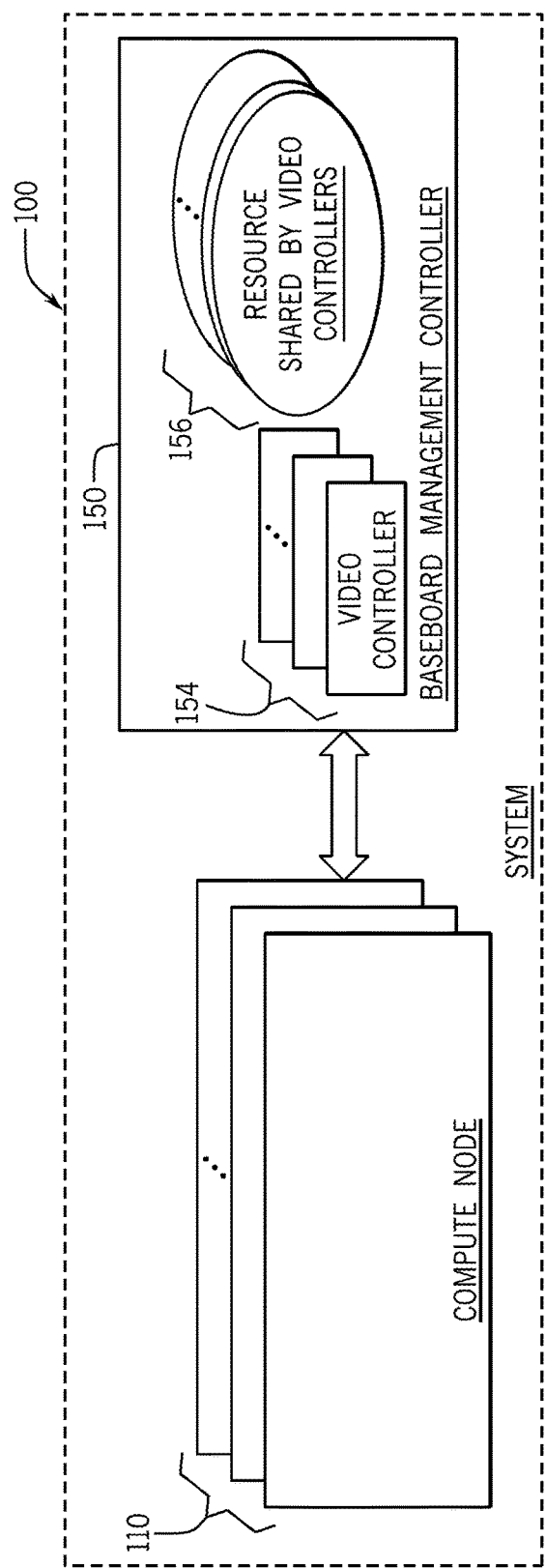
FIGS. 1 and 3 are schematic diagrams of multiple host computer systems according to example implementations.

As a more specific example, FIG. 1 depicts a computer system 100 in accordance with example implementations. In general, the system 100 is a multiple host system, which includes multiple hosts, called "compute nodes 110" herein. In general, a compute node 110 contains one or more processors (central processing units (CPUs), memory, network interfaces, bridges, and so forth). The compute nodes 110 may be separate physical machines, host partitions formed on a physical machine, or any combination thereof, depending on the particular implementation. As a more specific example, in accordance with some implementations, the compute nodes 110 may be formed in a four socket machine, which is partitioned into two independent two socket systems; and each independent two socket system may form a corresponding compute node 110. It is noted that the system 100 may have more or fewer than two compute nodes 110, in accordance with further example implementations. The compute node 110 includes machine executable instructions, or "software," which when executed by the CPU(s) cause the CPU(s) to provide one or more software components, such as an operating system, application, device drivers, and so forth. In general, the compute nodes 110 are individually-operated computer systems that are coupled to each other through an infrastructure, such as a network fabric (not shown).

The system 100 of FIG. 1 includes a baseboard management controller 150, which contains video controllers 154 that are associated with the compute nodes 110. As an example, in accordance with some implementations, each video controller 154 may be uniquely associated with a given compute node 110 for purposes of providing a compatible video subsystem for the node 110. The baseboard management controller 150 further includes one or multiple resources 156, which are shared by the video controllers 154. As examples, the resource(s) 156 may include a video memory, a digital-to-analog converter (DAC), a phase locked loop (PLL), and so forth.

In accordance with example implementations, the video controller 154 may be a video graphics adapter (VGA) or super VGA (SVGA) graphics adapter video subsystem, which allows each compute node 110 to execute an existing operating system without modification for the video services that are provided by the baseboard management controller 150. As a more specific example, the video controller 154 may be an SVGA controller, which is register compatible with the IBM VGA adapter and offers extended modes and capabilities through driver or basic input/output system (BIOS) enhancements. The baseboard management controller 150, in accordance with example implementations, may provide remote keyboard/video/mouse (KVM)-based video redirection for each compute node 110. Moreover, in accordance with example implementations, the resource 156 may include a single dynamic random access memory (DRAM) device that is used by the video controllers 154, which allows the number of compute nodes 110 to scale without imposing additional costly memory requirements on the memory subsystem of the baseboard management controller 150. Moreover, in accordance with example implementations, the number of compute nodes 110 may scale without imposing multiple instances of area intensive I/O macros. As described herein, this allows multiple compute nodes 110 to share a single PLL (a resource 156) and a single set of external display interfaces.

Figure 2:
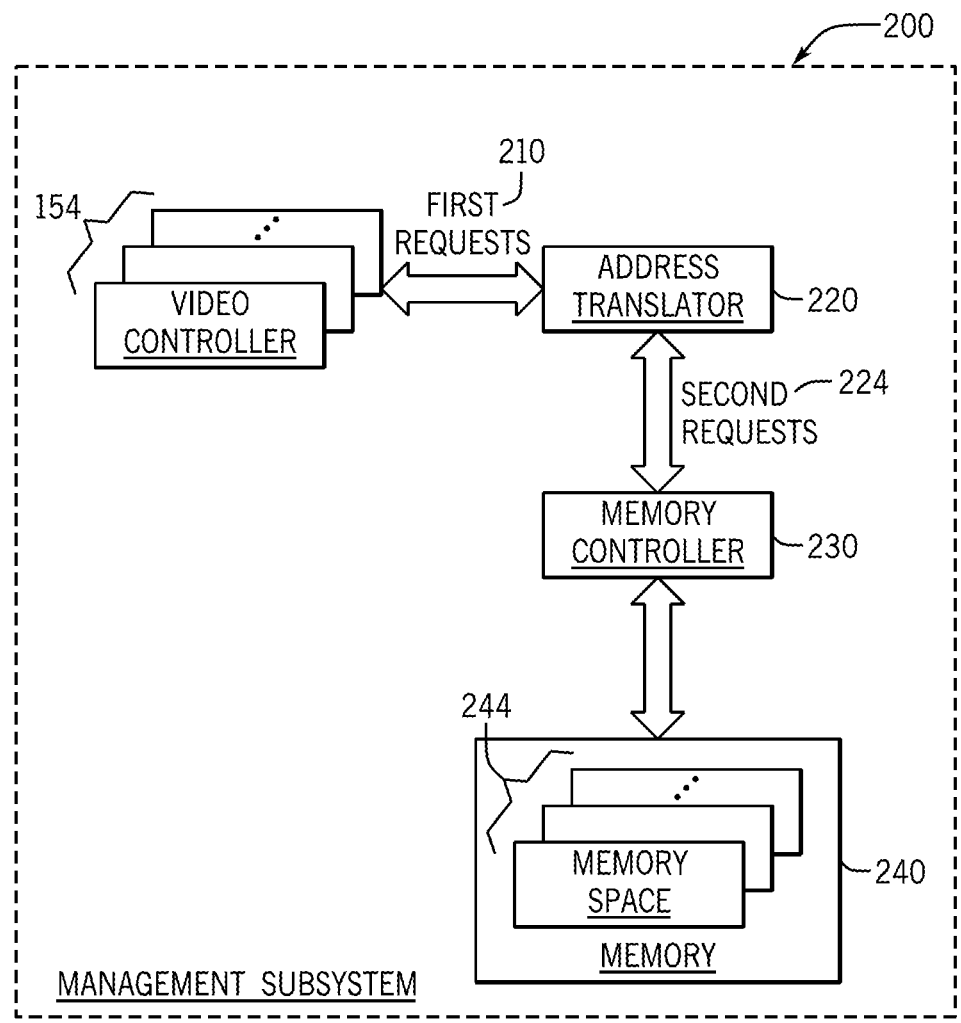
FIG. 2 is a schematic diagram of a subsystem of a management subsystem for a multiple host computer system according to an example implementation.

Referring to FIG. 2, in accordance with an example implementation, a management subsystem 200 for a multiple host computer system includes the video controllers 154, a memory 240 that is shared by the video controllers 154 and which contains memory spaces 244 (or "frame buffers"), which are associated with and used by the corresponding video controllers 154. In this regard, in accordance with example implementations, a given video controller 154 is uniquely assigned to a memory space 244 and uses the memory space 244 for purposes of rendering its graphic images.

The video controllers 154, in accordance with example implementations, are "single host" video controllers (single host VGA adapters, for example), which are configured to access the same address space. To accommodate the use of such single host video controllers 154, the subsystem 200 includes an address translator 220. In this manner, the address translator 220 receives first requests 210 from the video controllers 154, where the first requests 210 are directed to the same address space. The address translator 220 converts the first requests 210 into corresponding second requests 224, which allow the video controllers 154 to share the memory 240. In this regard, in accordance with example implementations, the address translator 220 converts the first requests 210 into second requests 224 that are directed to the individual memory spaces 244 and serializes the second requests 224 for purposes of providing the requests 224 to a memory controller 230 (a shared resource). The memory controller 230 may then process the second requests 224 for purposes of communicating graphics rendering traffic with the memory 240.

Figure 3:
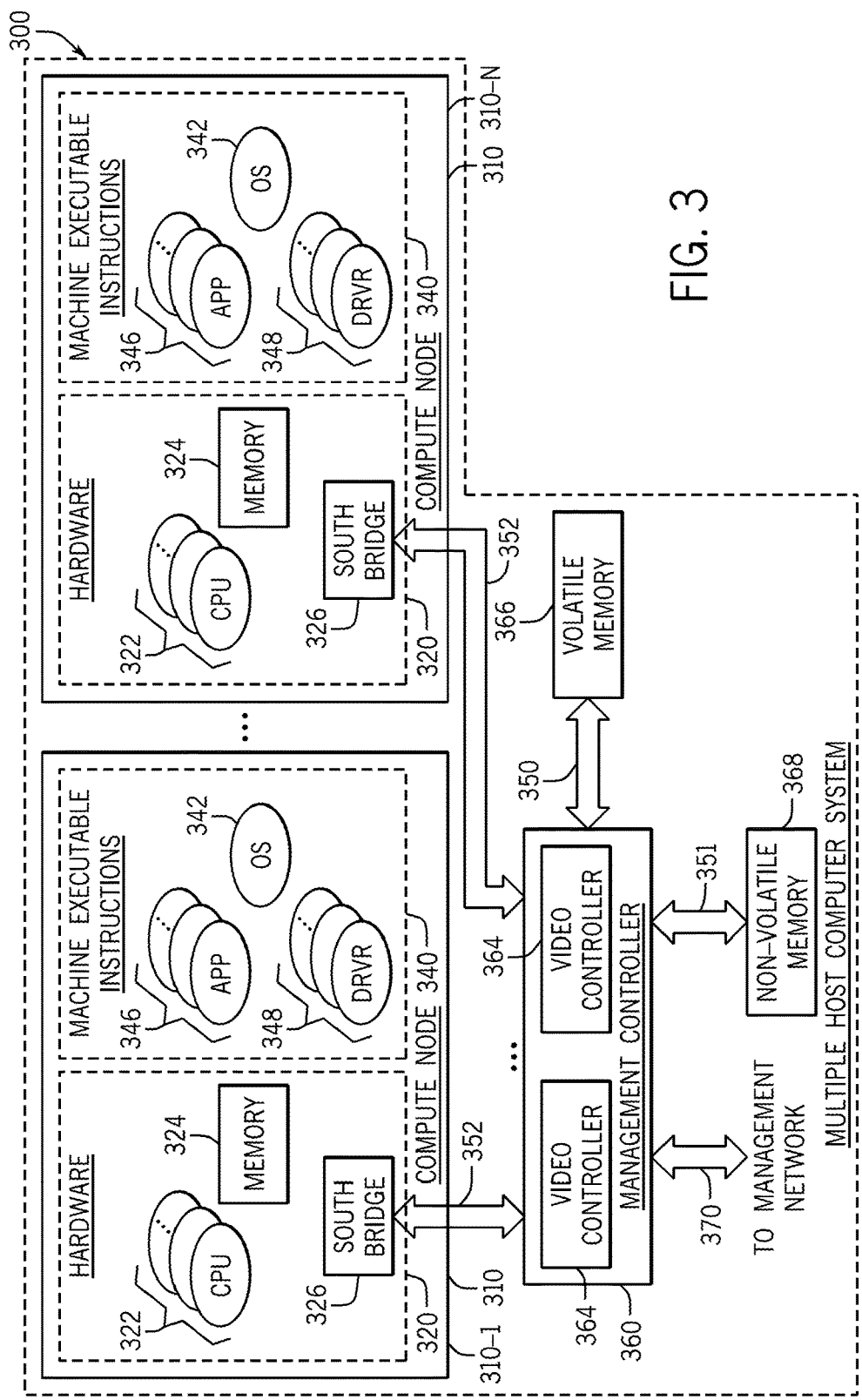

Referring to FIG. 3, as a more specific example, in accordance with some implementations, a multiple host computer system 300 includes N compute nodes 310 (compute nodes 310-1 and 310-N, being depicted as examples in FIG. 3). In general, the compute node 310 is a physical machine that is made up of actual hardware 320 and actual machine executable instructions 340, or "software." As an example, the hardware 320 may include one or multiple central processing units (CPUs) 322, a memory 324 and a memory I/O hub, or south bridge 326.

The memory 324, in general, is a non-transitory storage medium, which may be formed from one or more of the following: semiconductor storage devices, optical storage devices, magnetic storage devices, phase change memory devices, memristors, and so forth. In general, the memory 324 stores program instructions, data, data structures, and so forth for its compute node 310.

The south bridge 326, in general, may form a communication bridge for the compute node 310 for purposes of communicating (over a communication link 352, such as a Peripheral Component Interconnect-Express (PCI-E) bus, for example) with a management controller 360 (a baseboard management controller, for example), which is used by all of the compute nodes 110, as described herein. In accordance with example implementations, the south bridge 326 communicates drawing commands and data from the compute node 310 to an associated video controller 364 of the management controller 360.

In accordance with example implementations, the machine executable instructions 340 may include instructions that are executed by the CPU(s) 322, such as instructions that are associated with an operating system 342, one or multiple applications 346, one or multiple device drivers 348, and so forth. In accordance with example implementations, a given driver 348 may be a video device driver, which constructs drawing commands and transfers data to/from the video controller 364 associated with the compute node 310.

In accordance with example implementations, the management controller 360 contains two or more video controllers 364. The video controller 364 may be a "single host" video controller, and each of the video controllers 364 may be assigned to different compute node 310. As an example, in accordance with example implementations, the video controller 364 may be a VGA adapter, and the video controllers 364 may be identical. As also depicted in FIG. 3, in general, the management controller 360 may include a volatile memory 366, which may be a shared resource that is used by the video controllers 364. In this manner, in accordance with example implementations, the video controllers 364 may communicate data to/from the volatile memory 366 via a memory bus 350, and volatile memory 366 may contain frame buffers for the associated video controllers 364. Moreover, the volatile memory 366 may store one or more frame buffer contexts as well as code and data for the management controller 360. The management controller 360 may also access a non-volatile memory 368 (via a memory bus 351) for purposes of storing, for example, machine executable instructions, or program instructions, for the management controller 360.

As also shown in FIG. 3, the management controller 360 may be coupled via a network connection 370 (an Ethernet connection, for example) to a management network, which may include one or more computers (not shown) that remotely manage the compute nodes 310.

Figure 4:
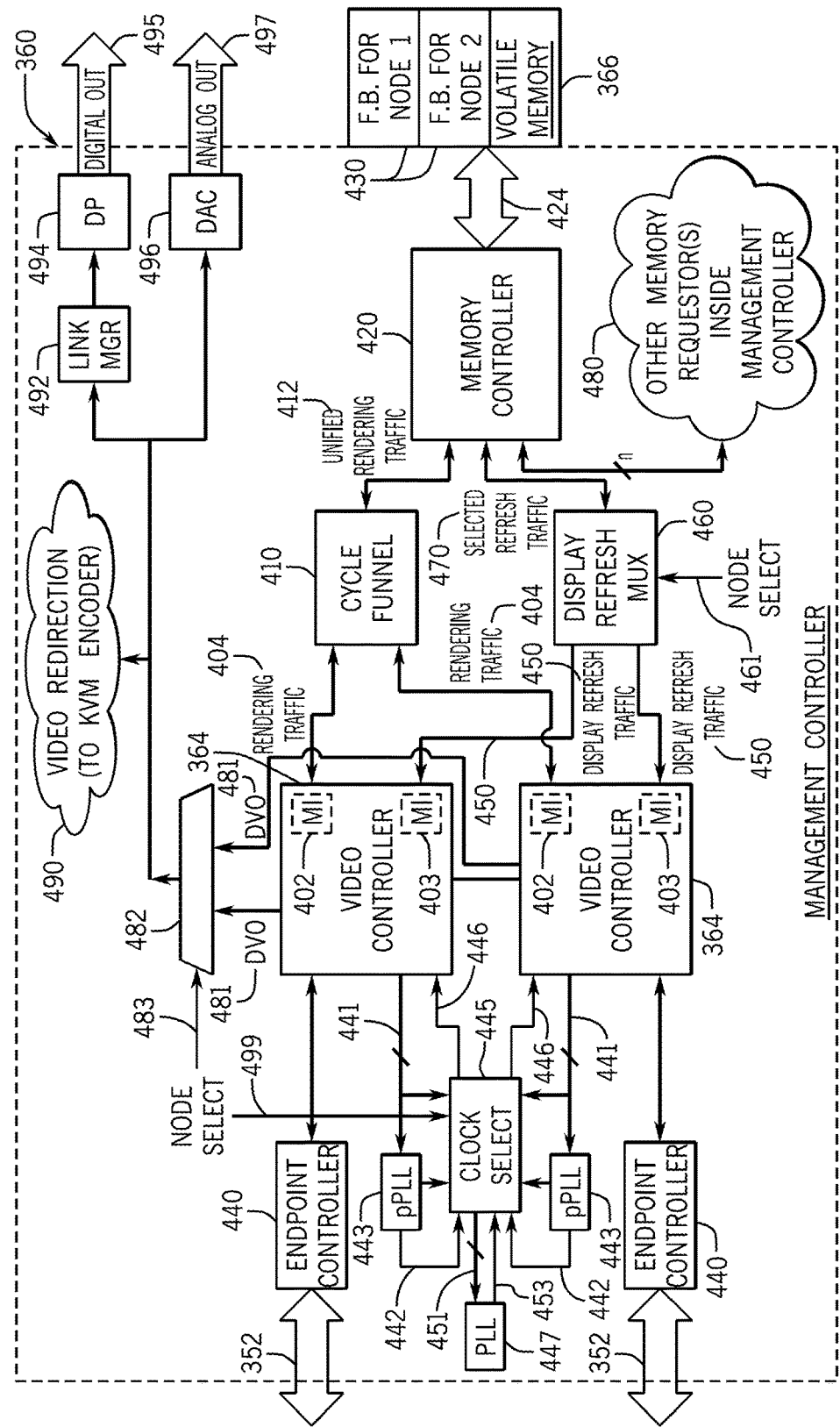
FIG. 4 is a schematic diagram of a management controller of FIG. 3 according to an example implementation.

Referring to FIG. 4 in conjunction with FIG. 3, in accordance with example implementations, the management controller 360 contains two or more video controllers 364. The video controllers 364 are operationally coupled to the compute nodes 310 through corresponding endpoint controllers 440, such as Peripheral Component Interconnect-Express (PCI-E) endpoint controllers, for example. The endpoint controller 440 allows the operating system 342 running on the corresponding compute node 310 to discover, configure, and control its own set of video controller hardware, in accordance with example implementations. As an example, upon discovery of its associated video controller 364, the operating system 342 may load a corresponding display driver to facilitate the rendering of images to either a local display (not shown) or a remote display (not shown) using KVM redirection hardware 490.

In accordance with example implementations, the video controller 364 contains two memory interfaces: a first memory interface 402 that provides bi-directional (read/write) access to the volatile memory 366 (and a corresponding frame buffer 430) for purposes of rendering display commands that are issued by the operating system driver 348; and a second memory interface 403, which provides read-only access to the rendered frame buffer 430 so that image may be represented on an analog or digital display interface. The second memory interface 403 may be a relatively intensive bandwidth interface, which may read the entire frame buffer 430 (several megabytes in size, for example) at a relatively fast rate (60-85 times per second, for example).

More specifically, in accordance with example implementations, the first memory interface 402 for each video controller 364 is coupled to a cycle funnel 410. In general, the cycle funnel 410 is an address translator, which is constructed to allow unified serialized access to the shared memory controller 420 resource. The cycle funnel 410 receives each request from the memory interface 402, which is a request directed to rendering traffic 404. The rendering traffic 404, in turn, is directed to the same memory space for each video controller 364, in accordance with example implementations. The cycle funnel 410 takes each request received from the video controllers 364, translates the address into a unified memory model and re-issues the requests in a serialized fashion to the memory controller 420, as represented by a unified rendering traffic 412 in FIG. 4.

The cycle funnel 410 is also responsible for returning read information to the appropriate requester. The cycle funnel 410 may, in accordance with example implementation, insert wait states on each request to ensure that each video controller 364 receives an equal amount of rendering traffic bandwidth.

In accordance with example implementations, the second memory interface 403 of the video controller 364 receives display refresh traffic 450. The second memory interfaces 403 are operationally coupled to a display refresh multiplexer 460. Unlike the cycle funnel 410, the display refresh multiplexer 460 allows a selected subset of one or more video controllers 364 to be coupled to the memory 366, and this selected subset of one or more video controllers 364 furnish video output via corresponding digital video output (DVO) signals 481. As depicted in FIG. 4, the display refresh multiplexer 460 communicates selected refresh traffic data 470 to/from the memory controller 420. The video controller(s) 364 may be selected using a compute node selection signal that is received via terminal(s) 461 of the display refresh multiplexer 460. The selection of the subset of video controller(s) 364 that are actually being used to provide video output(s) allows the display refresh multiplexer 460 to satisfy real-time requests without overwhelming or oversaturating the shared memory resource, in accordance with example implementations. Accordingly, the selected subset of video controller(s) 364 that are allowed to pass request information through the display refresh multiplexer 460 produce corresponding video output stream(s) that are routed to the appropriate display device(s), whereas requests for other, non-selected video controller(s) 364 are not processed.

In accordance with example implementations, the display refresh multiplexer 460 provides placebo, or placeholder, data to the non-selected video controller(s) 364 prevent the display engine(s) of the video controller(s) 364 from experiencing side effect(s) due to the engine(s) being unconnected. Using a multiplexer 482 that multiplexes digital video outputs from the video controllers 364, the video streams from the video controller(s) 364 receiving placebo display refresh information are ignored, or not selected by the multiplexer 482 (as controlled by control terminal(s) 483 of the multiplexer 482, which receives the compute node selection signal).

For the example implementation of FIG. 4, a single video controller 364 is selected to provide a digital video output signal s (called "DVO" in FIG. 4), and the multiplexer 482 selects the single video controller 364 for purposes of providing the output stream from the selected video controller 364 as a video output for the management controller 360.

Thus, the display refresh multiplexer 460 ensures that each video controller 364 receives valid interface response signals regardless of its connected state (i.e., regardless of whether a given video controller 364 is providing a real DVO output stream or not). The display refresh multiplexer 460 further ensures that any outstanding requests from a connected video controller 364 are satisfied before allowing a configuration switch of the connected video controller(s) 364.

The cycle funnel 410 allows each compute node 310 to separately and simultaneously render images into the frame buffers 430 that, in accordance with example implementations, are uniquely assigned to the compute nodes 310 (and associated video controllers 364). The multiplexer 482 allows an administrator to selectively display output from one or multiple sources. In this regard, in accordance with some implementations, management control firmware may perform periodic selection of the "connected" video controller so that video redirection logic may take a "snapshot" of the video output from multiple node instances at a reduced refresh rate. A link manager 492 of the management controller 360 establishes and trains the source and sync, sets the speed of the link, and so forth. Firmware that is executed on the management controller 360 may, in accordance with example implementations, periodically control terminals 483, 499 and 461 for purposes of obtaining snapshots of the video output from multiple node instances. Firmware executed on the management controller may also perform the job of unifying the image or creating a web page, in accordance with example implementations.

As depicted in FIG. 4, the management controller 360 may include a digital interface 494 (containing interfaces, such as DisplayPort, HDMI, DVI, and so forth) to provide a digital video output 495 (and a DAC 496 to provide an analog output 497. The management controller 360 may also include KVM redirection logic 490.

In accordance with example implementations, for purposes of providing a relatively stable output image, the video controller 364 receives a relatively precise and relatively low jitter clock signal. Moreover, the video controller 364, regardless of its "connected" status, uses a clock input of varying frequency, based on its display mode. In accordance with example implementations, the management controller includes a separate phase locked loop (PLL) for each video controller 364.

In accordance with further example implementations, for purposes of conserving die area and power, the management controller 360 includes a single PLL 447 and a pseudo-PLL 443 for each video controller 364, as depicted in FIG. 4. In accordance with example implementations, the pseudo PLL 443 is a non-PLL-based frequency divider (a clocked register, for example). In this regard, as shown in FIG. 4, in accordance with example implementations, the PLL 447 receives input signals or control lines 451 for purposes of selecting a clock signal that is provided by the PLL 447 to the selected video controller 364 for purposes of the controller 364 providing its output and receiving the display refresh traffic from the display refresh multiplexer 460.

The other, non-selected video controller(s) 364 receive their clock signal(s) from associated pseudo PLL(s) 443. The pseudo PLL 443 has select inputs 441, which specify the desired frequency that is requested by the video controller 364 for the configured display mode. In this regard, a clock selection circuit 445 of the management controller 360 is controlled by a node select signal (received at control terminal(s) 499) and provides the clock signals to the video controllers 364 (via clock lines 446). The clock selection circuit 445 receives a clock signal from the PLL 447 on an input terminal 453. The clock selection circuit 445 switches between the low jitter, area intensive PLL clock output and a relatively higher jitter but more area efficient pseudo PLL clock output based on the node select signal. This arrangement, in accordance with example implementations, has the advantage of ensuring that all video controllers 364 are provided a clock signal having the correct frequency, where the valuable, low jitter clocking resources are assigned to video controller(s) 364 that are actively providing output video signals.

In accordance with example implementations, the volatile memory 366 may also be used for management functions. Thus, as shown in FIG. 4, one or multiple other memory requestors 480 inside the management controller 360 may access the memory 366 by interacting with the memory controller 420. The memory controller 420 ensures exclusivity of the memory resources based on the requestor, in accordance with example implementations.

Figure 5:
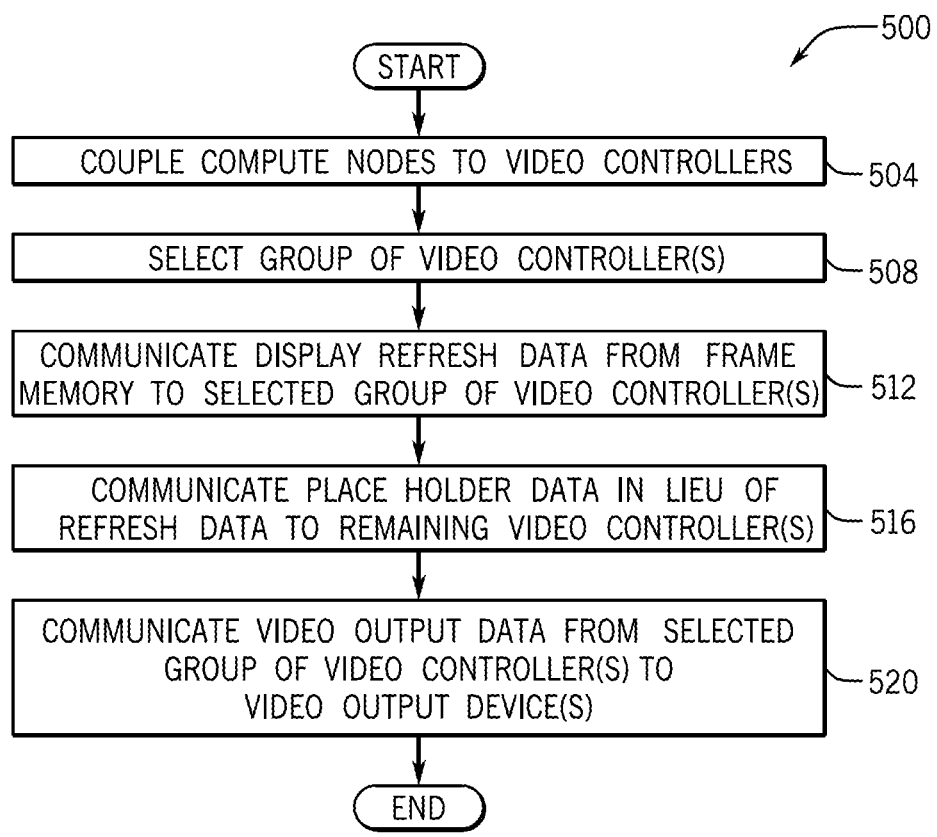
FIG. 5 is a flow diagram depicting a technique to communicate refresh data to multiple video controllers that share a video memory according to an example implementation.

Referring to FIG. 5, thus, in accordance with example implementations, a technique 500 includes coupling (block 504) compute nodes to video controllers and selecting (block 508) a first set of one or more of the video controllers. Pursuant to the technique 500, display refresh data is communicated (block 512) from a frame memory to the selected first set of video controller(s) and placeholder data is communicated (block 516) in lieu of refresh data to the remaining video controller(s). Pursuant to the technique 500, video output data from the first set of video controller(s) may then be communicated (block 520) to the video output device.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. An apparatus comprising:
a plurality of video controllers associated with a plurality of compute nodes and to provide first requests associated graphics rendering operations to a first memory address space shared in common by the video controllers;
an address translator to receive the first requests and convert the first requests into second requests directed to a plurality of separate memory spaces such that each separate memory space is associated with a different video controller of the plurality of controllers;
a memory controller to receive the second requests and generate memory cycles with a memory in response thereto;
a refresh multiplexer to receive a set of time overlapping display refresh requests from a group of the video controllers, select one or more of the video controllers, provide data from a rendered frame video memory to the selected one or more video controllers, and provide substitute data to the one or more non-selected video controllers of the group,
wherein the selected one or more video controllers comprise a first video controller and the non-selected one or more video controllers comprise a second video controller, the apparatus further comprising:
a phase locked loop (PLL) to provide a first clock signal;
a non-PLL based frequency divider to provide a second clock signal; and
a clock selector to, in response to the selection of the first video controller, provide the first clock signal to the first video controller to clock the first video controller and, in response to the non-selection of the second video controller, provide the second clock signal to the second video controller to clock the second video controller.

2. The apparatus of claim 1, wherein the address translator receives at least some of the first requests in a parallel fashion from at least two video controllers of the plurality of video controllers and provides the at least some first requests serially to the memory controller.

3. The apparatus of claim 1, wherein each video controller of the group provides video output signals, the apparatus further comprising:
a video stream multiplexer to select the video output signal for each selected video controller.

4. The apparatus of claim 1, further comprising at least one memory requestor associated with a compute node management controller to communicate memory requests to the memory controller.

5. The apparatus of claim 1, wherein the compute nodes comprise host partitions formed on a physical machine.

6. The apparatus of claim 1, wherein the apparatus is a management controller.

7. An method comprising:
at a plurality of video controllers associated with a plurality of compute nodes, providing first requests associated graphics rendering operations to a first memory address space shared in common by the video controllers;
receiving, at an address translator, the first requests;
converting, at the address translator, the first requests into second requests directed to a plurality of separate memory spaces such that each separate memory space is associated with a different video controller of the plurality of controllers;
receiving, at a memory controller, the second requests;
generating, by the memory controller, memory cycles with a memory in response thereto;
receiving, at a refresh multiplexer, a set of time overlapping display refresh requests from a group of the video controllers,
selecting, by the refresh multiplexer, one or more of the video controllers,
providing, by the refresh multiplexer, data from a rendered frame video memory to the selected one or more video controllers, and
providing substitute data to the one or more non-selected video controllers of the group,
wherein the selected one or more video controllers comprise a first video controller and the non-selected one or more video controllers comprise a second video controller,
providing a first clock signal by a phase locked loop (PLL);
providing a second clock signal by a non-PLL based frequency divider; and
in response to the selection of the first video controller, providing, by a clock selector, the first clock signal to the first video controller to clock the first video controller and, in response to the non-selection of the second video controller, provide the second clock signal to the second video controller to clock the second video controller.

8. The method of claim 7, further comprising:
receiving, at address translator, at least some of the first requests in a parallel fashion from at least two video controllers of the plurality of video controllers; and
providing, by the address translator, the at least some first requests serially to the memory controller.

9. The method of claim 7, further comprising:
providing video output signals by each video controller of the group; and
selecting, by a video stream multiplexer, the output signal for each selected video controller.

10. The method of claim 7, further comprising:
communicating memory requests to the memory controller by a compute node management controller, wherein at least one memory requestor associated with the compute node management controller.

11. The method of claim 7, wherein the compute nodes comprise host partitions formed on a physical machine.

* * * * *